United States Patent

[11] 3,627,799

[72] Inventors David E. Young
 Denville;
 Douglas E. Gould, Boonton; Lowell R. Anderson, Parsippany; William B. Fox, Morris Township, Morris County, all of N.J.
[21] Appl. No. 771,369
[22] Filed Oct. 28, 1968
[45] Patented Dec. 14, 1971
[73] Assignee Allied Chemical Corporation
 New York, N.Y.

[54] PROCESS FOR THE PREPARATION OF POLYHALOALKYL CHLOROFORMATES
 11 Claims, No Drawings
[52] U.S. Cl. .................................................. 260/463,
 23/86, 252/426, 260/67, 260/75, 260/77.5,
 260/453, 260/543, 424/301, 424/315
[51] Int. Cl. .................................................. C07c 69/64,
 C01b 31/26, A01n 9/12
[50] Field of Search .......................................... 260/463,
 543

[56] References Cited
UNITED STATES PATENTS

| | | | |
|---|---|---|---|
| 2,959,611 | 11/1960 | Nelson et al. .................. | 260/463 |
| 3,220,978 | 11/1965 | Jaquiss ......................... | 260/47 |
| 3,226,418 | 12/1965 | Anderson et al. ............... | 260/463 |
| 3,452,074 | 6/1969 | Weesner ........................ | 260/463 |

*Primary Examiner*—Lewis Gotts
*Assistant Examiner*—Diana G. Rivers
*Attorney*—Herbert G. Burkard ABSTRACT: Chloroformates of the formula:

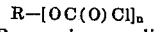

wherein $n$ is 1 or 2; R may be a radical selected from the group consisting of $SF_5$ and an open chain YZ-perhaloalkyl group when $n$ is 1, R may be an open-chain YZ-perhaloalkylene group containing at least three carbon atoms when $n$ is 2, wherein Y and Z are substituents on the R moiety and are the same or different electronegative groups; may be prepared by reacting hypochlorites of the formula $R-(OCl)_n$ wherein R and $n$ are as defined above, with carbon monoxide. The novel chloroformates are useful as catalysts for the polymerization of unsaturated compounds, as agricultural fumigants and in the preparation of polycarbonates, polyesters and formaldehyde polymers.

PROCESS FOR THE PREPARATION OF POLYHALOALKYL CHLOROFORMATES

CROSS-REFERENCES TO RELATED APPLICATIONS

1. Copending application of D. E. Gould, D. E. Young, L. R. Anderson and W. B. Fox, entitled "Pentafluorosulfur Hypochlorite," Ser. No. 734,871, filed June 6, 1968.

2. Copending application of D. E. Gould, L. R. Anderson and W. B. Fox, entitled "Novel Perhaloorgano Hypochlorites and Process for the Preparation Thereof," Ser. No. 734,515, filed June 5, 1968.

3. Copending application of D. E. Gould, D. E. Young, L. R. Anderson and W. B. Fox, entitled "Novel Tertiary Polyhaloalkyl Hypochlorites and Process for the Preparation Thereof," Ser. No. 772,037, filed Oct. 30, 1968.

SUMMARY OF THE INVENTION

We have discovered a novel class of chloroformates having the formula $$R-[OC(O)Cl]_n \quad (I)$$

wherein $n$ is 1 or 2; R is a radical selected from the group consisting of $SF_5$ and an open chain YZ-perhaloalkyl group when $n$ is 1, and R is an open-chain YZ-perhaloalkylene group containing at least three carbon atoms when $n$ is 2, wherein Y and Z are substituents forming part of the R moiety and are the same or different electronegative groups.

The novel chloroformates are useful as catalysts for the polymerization of unsaturated compounds and may be used for this purpose in a conventional manner as described in Belgium Pat. No. 616,933. The novel chloroformates are also useful as agricultural fumigants being effective against nematodes and insects. The compounds of the invention are also useful in the preparation of polycarbonates having biological activity in the manner described in U.S. Pat. No. 3,124,608 and U.S. Pat. No. 3,218,347; to prepare formaldehyde polymers in the manner described in British Pat. No. 992,988 and to prepare polyesters in the manner described in U.S. Pat. No. 3,089,884.

We have also discovered a novel process for preparing the novel chloroformates of the instant invention which comprises reacting hypochlorites of the formula $$R-(OCl)_n \quad (II)$$

wherein R and $n$ are as defined above, with carbon monoxide (CO) in the absence of light or in the presence of light consisting essentially of light possessing wave lengths in excess of 4,000 Angstroms.

The reaction of the hypochlorite starting materials of formula II with carbon monoxide under the above-described conditions to produce the chloroformates of the instant invention was unexpected in view of the fact that attempted reaction of the corresponding known hypofluorites with carbon monoxide under the same conditions is negative, that is to say no reaction takes place.

DETAILED DESCRIPTION AND THE PREFERRED EMBODIMENTS

With reference to formula I above, the Y and Z substituents may be the same or different electronegative groups. This is not a critical portion of the molecule, however, examples of suitable electronegative groups are as follows: $FSO_2$, $FSO_3$, $NO_2$, halogen, perfluoroalkyl, perfluorocycloalkyl and perfluoroaryl. Those of ordinary skill in the art will readily be able to conceive of and incorporate other electronegative groups which can serve as Y and Z substituents.

Preferably, Y and Z are both halogen atoms, particularly fluorine.

The term open chain, as used herein, is intended to include any straight chain or branched chain structure. Branched chain structures may include secondary or tertiary branched chain structures.

A preferred class of compounds within the scope of the instant invention are those which contain a minimum number of fluorine atoms which is at least equal to one-half the total number of halogen atoms and electronegative groups present in the molecule.

Subject to the indicated proviso in the definition of the chloroformates of the invention, the preferred number of carbon atoms in the R group is from 1-15. Compounds in which the R group contains more than 15 carbon atoms may be prepared, however, exhibit the same properties.

As can be seen from formula I, when $n$ is 1 a class of monochloroformates is defined. When $n$ is 2 a class of dichloroformates is formed. When $n$ is 1 and R is a YZ-perhaloalkyl group, R preferably contains from 1-6 carbon atoms and more preferably from 1-3 carbon atoms. When $n$ is 2, the R group preferably contains from 3-10 carbon atoms and more preferably from 3-6 carbon atoms.

Preferably all halogen atoms in the molecule are selected from F and Cl and more preferably, all the halogen atoms in the molecule are F.

Illustrative compounds within the scope of the invention are as follows:

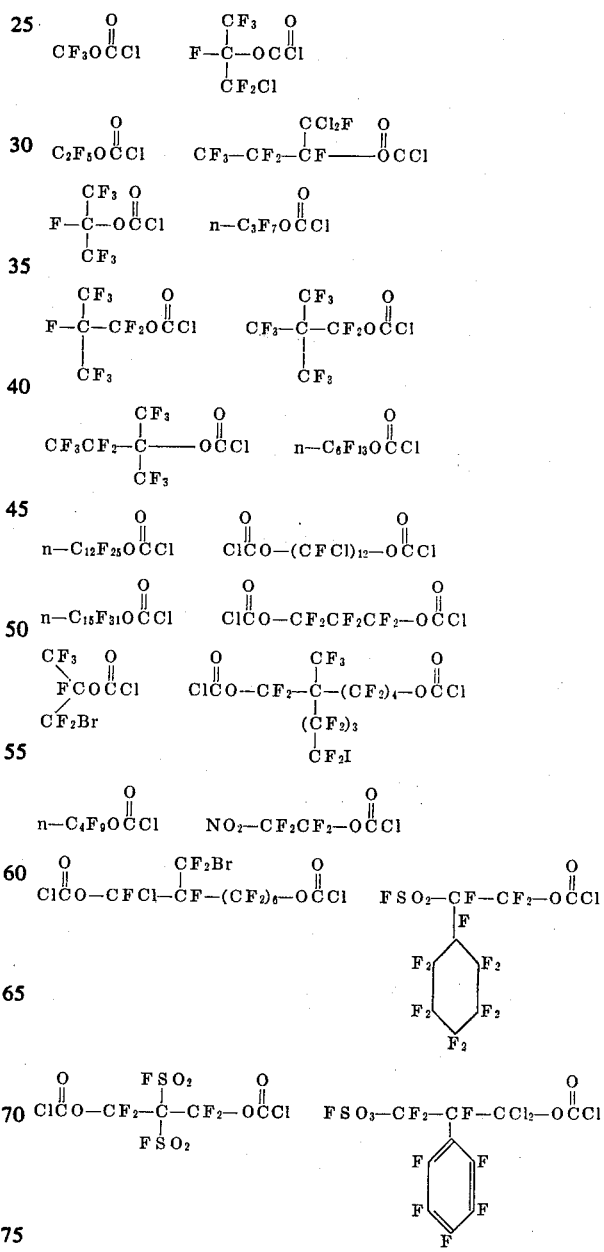

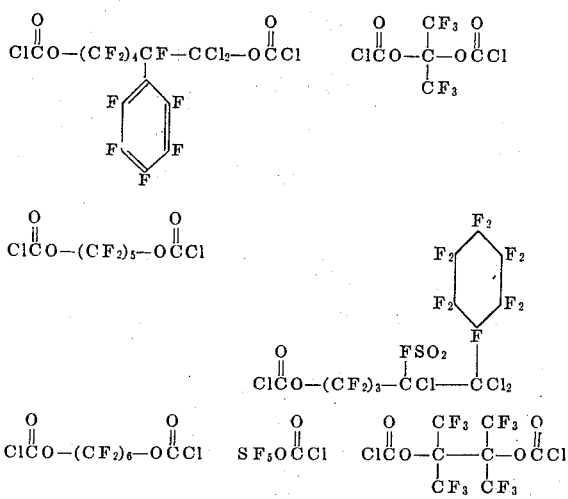

The starting materials for the novel chloroformates of the instant invention are pentafluorosulfur hypochlorite and the corresponding polyhaloorgano hypochlorites.

Polyhaloorgano hypochlorite starting materials in which the carbon atom or atoms attached to the —OCl group or groups are each bonded to no more than two carbon atoms, may be prepared by reacting a starting compound containing at least four atoms including one or two carbonyl groups associated other than in an aldehyde linkage, in which the noncarbonylic portion or portions of the molecule comprise open chain YZ-perhaloalkyl groups, or open chain YZ-perhaloalkylene groups, wherein Y and Z are substituents on the perhaloalkyl or perhaloalkylene groups and may be the same or different and are selected from electronegative groups unreactive to the —OCl groups, with an inorganic chlorinating reagent containing a chlorine atom in a +1 oxidation state which chlorine atom is attached to a more electronegative element, in the presence of a catalyst comprising a metal fluoride selected from he group consisting of LiF, NaF, KF, RbF CsF. $COF_2$, acids, acid halides and ketones are examples of suitable nonaldehyde carbonylic starting materials. The preferred chlorinating reagents are ClF and $Cl_2O$. The preferred reaction temperatures for this reaction range from about −78° to about 0° C. The process is disclosed in more detail in copending application Ser. No. 734,515 mentioned supra, the pertinent subject matter of which is hereby incorporated by reference.

Polyhaloorgano hypochlorite starting materials in which the carbon atom or atoms attached to the —OCl group or groups are each bonded to three carbon atoms (polyhalo tertiary hypochlorites) may be prepared by reacting the corresponding polyhalo tertiary alcohol with ClF. The tertiary polyhalo alcohol precursors are a known class of compounds and can be prepared by standard techniques.

The pentafluorosulfur hypochlorite starting material may be prepared by reacting $SOF_4$ with an inorganic chlorinating reagent as described above (e.g., ClF) for the preparation of the polyhaloorgano hypochlorite starting materials. Operating conditions for this reaction are the same as those described above. The preparation is disclosed in more detail in copending application Ser. NO. 734,871, mentioned supra, the pertinent subject matter of which is hereby incorporated by reference.

Reaction temperatures for the novel reaction between the hypochlorite starting materials and CO vary over a very wide range. The reaction proceeds quite readily at very low temperatures, −78° C. for example, and will proceed satisfactorily at temperatures up to 25° C. and higher. In view of the ready reaction at lower temperatures, however, there is no advantage in supplying heat to the reaction. Preferred temperatures range from about −78° C. to 0° C. and are most preferably in the order of about −30° C. to 0° C. Depending on the particular starting hypochlorite material chosen, the optimum reaction temperature may vary within the above indicated ranges. Accordingly, the optimum temperature range for a particular reaction can be determined routinely.

Atmospheric, subatmospheric or superatmospheric pressure may be successfully employed in the practice of the process of the instant invention.

The reaction can be carried out with the reactants in liquid, vapor or solid phase. In the latter case any inert solvent is preferably employed, such as, for example, a halogenated hydrocarbon such as $CFCl_3$.

The stoichiometry of the reaction requires 1 mol of carbon monoxide for each hypochlorite function in the molecule which is converted to the chloroformate function. Hence, in the case of monochloroformates a 1:1 molar ratio of reactant is required. In the case of bichloroformates, 2 mols of CO per mol of bihypochlorite starting compound are required. In order to ensure complete reaction a slight stoichiometric excess of CO can be employed. There is no advantage in employing very large stoichiometric excesses of the CO reactant although large excesses of the same will not deleteriously affect the reaction.

The reaction proceeds readily in the absence of light or in the presence of light consisting essentially of wavelengths in excess of 4,000 angstroms. It was surprising that the reaction would proceed under these conditions. Another way of defining the above conditions is to say that the reaction is carried out under the exclusion of light consisting essentially of wavelengths under 4,000 angstroms. The limitation that the light, if present, consists essentially of wavelengths greater than 4,000 angstroms includes the visible light spectrum but would exclude the ultraviolet light spectrum. It is to be understood, however, that the expression consisting essentially of wavelengths greater than 4,000 angstroms is open to ordinary daylight and ordinary incandescent or fluorescent illumination which may contain small amounts of ultraviolet light. Thus, the above definition is only intended to exclude light which consists essentially of ultraviolet light and/or other forms of nonvisible light possessing wavelengths shorter than 4,000 angstroms.

Materials of construction for the apparatus used for the subject reactions should be inert to the reactants employed. Stainless steel and fluoropolymers, for example, polytetrafluoroethylene and polychlorotrifluoroethylene are illustrations of suitable types of materials for this purpose which are of an opaque nature and thus would prevent the entry of any light whatsoever. Ordinary glass is an illustration of a suitable material of construction which is transparent and would thus permit the entry of light.

In the following examples parts and percentages are by weight unless otherwise indicated. Examples 1–6 and 9 illustrate the invention. Examples 7 and 8 illustrate the unobvious nature of the invention by examining the results of attempted reactions between the known analogous hypofluorites with CO.

EXAMPLE 1

Conventional vacuum techniques using a metal (nickel-Monel) "Plaskon" (TM of Allied Chemical Corporation for a polymer of chlorotrifluoroethylene) type fluoropolymer system were used to condense 5 millimol of $CF_3OCl$ into a 30 ml. stainless steel Hoke cylinder equipped with a stainless steel Hoke needle valve. No light had access to the reactants in the system. A slight excess of CO was then vacuum condensed into the cylinder at −196° C. The reactor was allowed to warm to −20° C. and was stored overnight at this temperature. At the end of this period, the cylinder was cooled to −196° C. and the excess CO was removed by pumping under vacuum. Although the reaction was essentially quantitative, the product was fractionated through a 123° C. trap. The product retained in the trap was a colorless liquid, b.p. 0° C. and was identified by elemental, infrared and nuclear magnetic resonance spectra analysis and by molecular weight determination to be

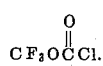

Analysis:
  Calculated for CF$_3$OC(O)Cl: %C, 16.18; %F, 38.40; %Cl, 23.91
  Found: %C, 16.16; %F, 37.78; %Cl, 24.14

EXAMPLE 2

0.5 millimol of CF$_3$OCl was condensed into a glass NMR tube at −196° C. This was followed by the addition of 0.5 millimol of CO to the tube. The reaction mixture was then allowed to warm to 0° C. and to react at that temperature for a period of 3 hours. This experiment was carried out in a laboratory room which was well illuminated by ordinary daylight and supplemented by overhead fluorescent lighting. The glass system permitted exposure of the reactants in the system to the available light. The infrared spectrum of the product after this period was compared with the infrared spectrum of the product of example 1. This comparison showed that almost a quantitative conversion of the

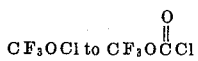

had taken place.

EXAMPLE 3

The procedure of example 1 was repeated excepting that 7 millimol of CF$_3$CF$_2$OCl was condensed into the stainless steel Hoke cylinder and at the end of the reaction period, the product was fractionated through a −111° C. trap. The product retained in this trap was a colorless liquid boiling at 28° C. and was identified as being

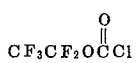

by elemental analysis, infrared and nuclear magnetic resonance spectra analysis and by molecular weight determination.
Analysis:
  Calculated: %C, 17.86; %F, 47.86; %C, 18.15
  Found: %C, 18.08; %F, 47.10; %C, 17.92

EXAMPLE 4

The procedure of example 1 was repeated excepting that 5 millimol of i—C$_3$F$_7$OCl was condensed into the stainless steel Hoke cylinder and at the end of the reaction period, the product was fractionated through a −95° C. trap. The product retained in this trap was identified as being

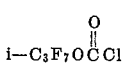

by elemental analysis, infrared and nuclear magnetic resonance spectra analysis and by molecular weight determination.
Analysis:
  Calculated: %C, 19.33; %Cl, 14.27; %F, 54.00
  Found: %C, 19.04; %Cl, 14.10; %F, 53.52

EXAMPLE 5

The procedure of example 1 was repeated excepting that SF$_5$OCl and a slight excess of CO were condensed into the stainless steel Hoke cylinder and at the end of the reaction period, the product was fractionated through a −95° C. trap. The product recovered was identified as being

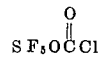

by elemental analysis, infrared and nuclear magnetic resonance spectra analysis and by molecular weight determination.
Analysis:
  Calculated: %C, 17.20; %F, 46.00; %Cl, 15.81; %S, 15.53
  Found: %C, 17.80; %F, 45.32; %Cl, 15.71; %S, 15.36

EXAMPLE 6

The procedure of example 1 was repeated except that about 3 millimol of

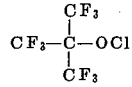

and a slight excess of CO were condensed into the stainless steel cylinder. The resulting mixture was allowed to warm to 0° C. and react at that temperature for 4 hours. At the end of this period, the cylinder was cooled to −196° C. and the excess CO was pumped away. The product mixture was analyzed and found to contain essentially pure

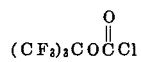

along with a small amount of (CF$_3$)$_3$COH impurity. The product was purified by first reacting the product mixture with ClF to convert the (DF$_3$)$_3$COH to (CF$_3$)$_3$COCl, followed by reacting the (CF$_3$)$_3$COCl thus produced with CO as described above. Pure

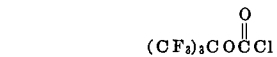

was obtained.
Analysis:
  Calculated: %C, 20.10; %Cl, 11.88; %F, 57.38
  Found: %C, 20.16; %Cl, 11.91; %F, 56.78

EXAMPLE 7

Attempted reaction of CF$_3$OF with CO.
Attempts to react CF$_3$OF with CO under the same conditions described in example 1 were negative. No reaction took place. The reaction temperature was raised to 25° C. and still no reaction took place.

EXAMPLE 8

Attempted Reaction of C$_2$F$_5$OF with Co.
Attempts to react C$_2$F$_5$OF with Co under the same conditions described in example 1 were negative. When the reaction temperature was raised to 25° C., however, a reaction did take place. The corresponding acid fluoride,

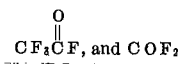

were formed, however, rather than the corresponding

product. The identities of these products were confirmed by infrared analysis.

EXAMPLE 9

Fumigant tests for

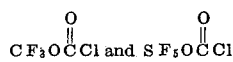

were run against four important common pests: confused flower beetle larvae, black carpet beetle larvae, yellow meal worm larvae and Panagrellus redivivus (Linné) nematodes. All tests were run under substantially identical conditions. In carrying out these tests, the test insects were subjected to vapors of the test compounds in a dosage of 1 lb. test compound per 1,000 cubic feet space. The exposure periods were 20 hours for

and 24 hours for

Mortality counts were made 3 days later. The results of these tests are set forth in table I.

TABLE I

| Test compound | Percent mortality | | | |
|---|---|---|---|---|
| | CFBL | BCBL | YMWL | PRN |
| $CF_3O\overset{O}{\underset{\|}{C}}Cl$ | 100 | 100 | 100 | 100 |
| $SF_5O\overset{O}{\underset{\|}{C}}Cl$ | 100 | 100 | 100 | 100 |
| Control | 0 | 0 | 0 | 0 |

NOTE.—CFBL=confused flower beetle larvae; BCBL=black carpet beetle larvae; YMWL=yellow meal worm larvae; PRN=*Panagrellus redivivus* nematodes.

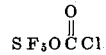

We claim:
1. A process for the preparation of a chloroformate of the structure

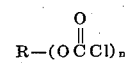

wherein $n$ is 1 or 2 when $h=1$, R is $SF_5$ or an open chain perhaloalkylene group of one to 15 carbons having substituents Y and Z thereon; and when $n=2$, R is an open chain perhaloalkylene group of three to 15 carbons having substituents Y and Z thereon; wherein Y and Z which can be the same or different are hypochlorite unreactive electronegative groups; said process comprising contacting a hypochlorite of the structure $R—(OCl)_n$ wherein R and $n$ are as defined above with at least $n$ moles of carbon monoxide per mole of hypochlorite wherein the value of $n$ for the moles of carbon monoxide corresponds to the value of $n$ in the hypochlorite reacted therewith, said contacting being effected substantially in the absence of light having a wavelength of less than about 4,000 angstroms.

2. A process in accordance with claim 1 wherein $n$ is 1.
3. A process in accordance with claim 1 wherein $n$ is 2.
4. A process in accordance with claim 1 wherein Y and Z are both halogen.
5. A process in accordance with claim 4 wherein Y and Z are both fluorine.
6. A process in accordance with claim 1 wherein R is a perfluoroalkylene group.
7. A process in accordance with claim 1 wherein said contacting is effected in the absence of all light.
8. A process in accordance with claim 1 wherein said contacting is effected at a temperature ranging from about −78° C. to about 0° C.
9. A process in accordance with claim 8 wherein said temperature ranges from about −30° C. to 0° C.
10. A process in accordance with claim 1 wherein said contacting is effected in the presence of an inert solvent.
11. The compound which is